(12) United States Patent
Huh et al.

(10) Patent No.: US 12,717,187 B2
(45) Date of Patent: Aug. 25, 2026

(54) LENS UNIT AND A DISPLAY DEVICE INCLUDING THE SAME

(71) Applicant: SAMSUNG DISPLAY CO., LTD., Yongin-si (KR)

(72) Inventors: Su Jung Huh, Yongin-si (KR); Eun Kyoung Nam, Yongin-si (KR); Young Soo Hwang, Yongin-si (KR); Su Bin Jung, Yongin-si (KR); Hyun Jin Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/676,733

(22) Filed: May 29, 2024

(65) Prior Publication Data

US 2025/0044646 A1 Feb. 6, 2025

(30) Foreign Application Priority Data

Aug. 1, 2023 (KR) ........................ 10-2023-0100620

(51) Int. Cl.

| | |
|---|---|
| ***G02F 1/1337*** | (2006.01) |
| ***G02B 30/28*** | (2020.01) |
| ***G02B 30/29*** | (2020.01) |
| ***G02F 1/1335*** | (2006.01) |
| ***G02F 1/1343*** | (2006.01) |

(52) U.S. Cl.
CPC ....... *G02F 1/133784* (2013.01); *G02B 30/28* (2020.01); *G02B 30/29* (2020.01); *G02F 1/133526* (2013.01); *G02F 1/134309* (2013.01)

(58) Field of Classification Search
CPC ........ G02B 30/29; G02B 30/28; G02B 30/27; G02F 1/133526
See application file for complete search history.

(56) References Cited

U.S. PATENT DOCUMENTS

| | | | | |
|---|---|---|---|---|
| 8,319,828 | B2 | 11/2012 | Kim et al. | |
| 8,614,782 | B2 | 12/2013 | Hong | |
| 9,971,166 | B2 | 5/2018 | Lee | |
| 2007/0296896 | A1 * | 12/2007 | Hong | G02F 1/133526 349/122 |

FOREIGN PATENT DOCUMENTS

| | | | | | |
|---|---|---|---|---|---|
| CN | 112462970 | A | * | 3/2021 | G02B 30/27 |
| CN | 114442358 | A | * | 5/2022 | |
| CN | 118068588 | A | * | 5/2024 | G02B 27/026 |
| KR | 10-1350475 | B1 | | 1/2014 | |
| KR | 10-1350971 | B1 | | 1/2014 | |
| KR | 10-2015-0081102 | A | | 7/2015 | |

* cited by examiner

*Primary Examiner* — Jessica M Merlin
(74) *Attorney, Agent, or Firm* — F. CHAU & ASSOCIATES, LLC

(57) ABSTRACT

A display device includes a display unit including a plurality of pixels arranged in a first direction and a second direction intersecting the first direction and a lens unit disposed on the display unit and configured to refract an image output from the display unit. The lens unit includes a lens array including a plurality of lenses each extending at an acute angle with respect to the second direction and a liquid crystal layer disposed on the lens array. The liquid crystal layer includes liquid crystal molecules oriented in substantially the same direction as an extension direction of the lenses.

12 Claims, 11 Drawing Sheets

<MODE 1>

LENS UNIT AND A DISPLAY DEVICE INCLUDING THE SAME

CROSS-REFERENCE TO RELATED APPLICATION

The application claims priority under 35 U.S.C. § 119 to Korean Patent Application No. 10-2023-0100620, filed Aug. 1, 2023, the disclosure of which is incorporated by reference herein in its entirety.

1. TECHNICAL FIELD

The present invention relates to an electronic device, and more specifically, to a lens unit and a display device including the same.

2. DISCUSSION OF THE RELATED ART

The importance of display devices as interfaces between users and information is being emphasized. Consequently, the use of display device such as liquid crystal display devices and organic light emitting display devices is on the rise.

A stereoscopic image display devices stimulate a viewer's visual senses so that an output image looks like a real object, allowing the viewer to perceive an image in three dimensions. For example, the stereoscopic image display device may provide different images to the left and right eyes of a viewer, allowing the perception of a stereoscopic image through binocular parallax between the two eyes.

Recently, there has been active research on display devices that allow viewing three-dimensional images without wearing glasses three-dimensional images to be perceived without requiring the use of glasses. For example, a lenticular lens configured to separate left and right eye images from an output image using a cylindrical lens array may be used.

SUMMARY

A display device according to embodiments of the present invention may include a display unit including a plurality of pixels arranged in a first direction and a second direction intersecting the first direction; and a lens unit disposed on the display unit and configured to refract an image output from the display unit. The lens unit includes a lens array including a plurality of lenses each extending at an acute angle with respect to the second direction; and a liquid crystal layer disposed on the lens array. The liquid crystal layer includes liquid crystal molecules oriented in substantially the same direction as an extension direction of the lenses.

A display device according to an embodiment of the present invention may include a display unit including a plurality of pixels arranged in a first direction and a second direction intersecting the first direction; and a lens unit disposed on the display unit and configured to refract an image output from the display unit. The lens unit may include a lens array including a plurality of lenses each extending at an acute angle with respect to the second direction; and a liquid crystal layer disposed on the lens array. The liquid crystal layer includes liquid crystal molecules symmetrically oriented based on an extension direction of the plurality of lenses.

A display device according to an embodiment of the present invention may include a display unit including a plurality of pixels arranged in a first direction and a second direction intersecting the first direction; and a lens unit disposed on the display unit and configured to refract an image output from the display unit. The lens unit includes a lens array including a plurality of lenses. The plurality of lenses extend and are slanted at an angle with respect to the second direction; and a liquid crystal layer disposed on the lens array. The liquid crystal layer includes liquid crystal molecules slanted in the same direction as the lenses

DETAILED DESCRIPTION OF THE EMBODIMENTS

Figure 1:
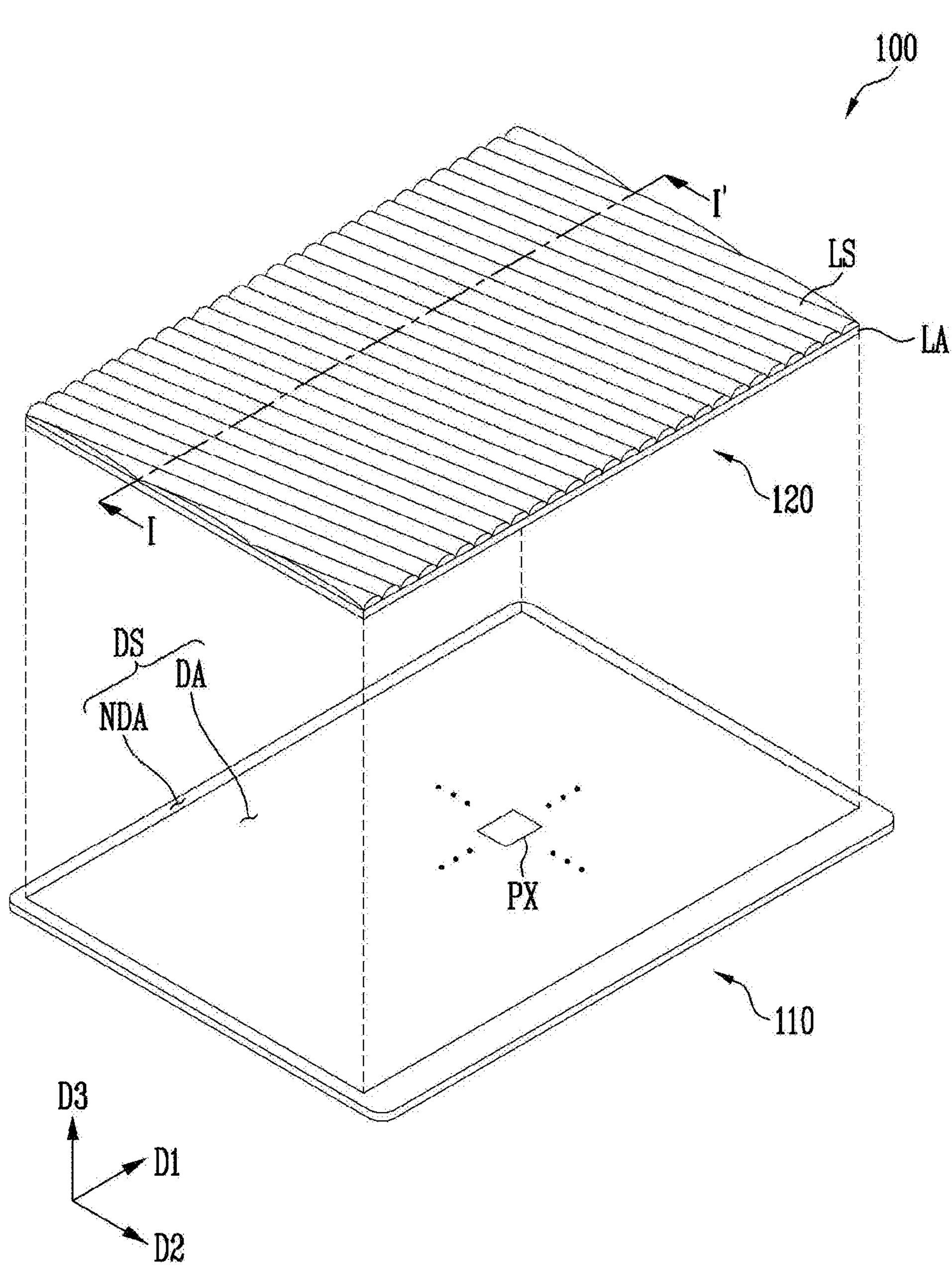
FIG. 1 is an exploded perspective view illustrating an embodiment of a display device according to the present invention.

Example embodiments of the present invention will now be described more fully hereinafter with reference to the accompanying drawings; however, they may be embodied in many different forms and should not be construed as limited to the embodiments set forth herein.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component discussed could also be termed a second component.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to shown specific shapes, and should be interpreted as including, for example, changes in shapes that occur as a result of manufacturing.

Figure 2:
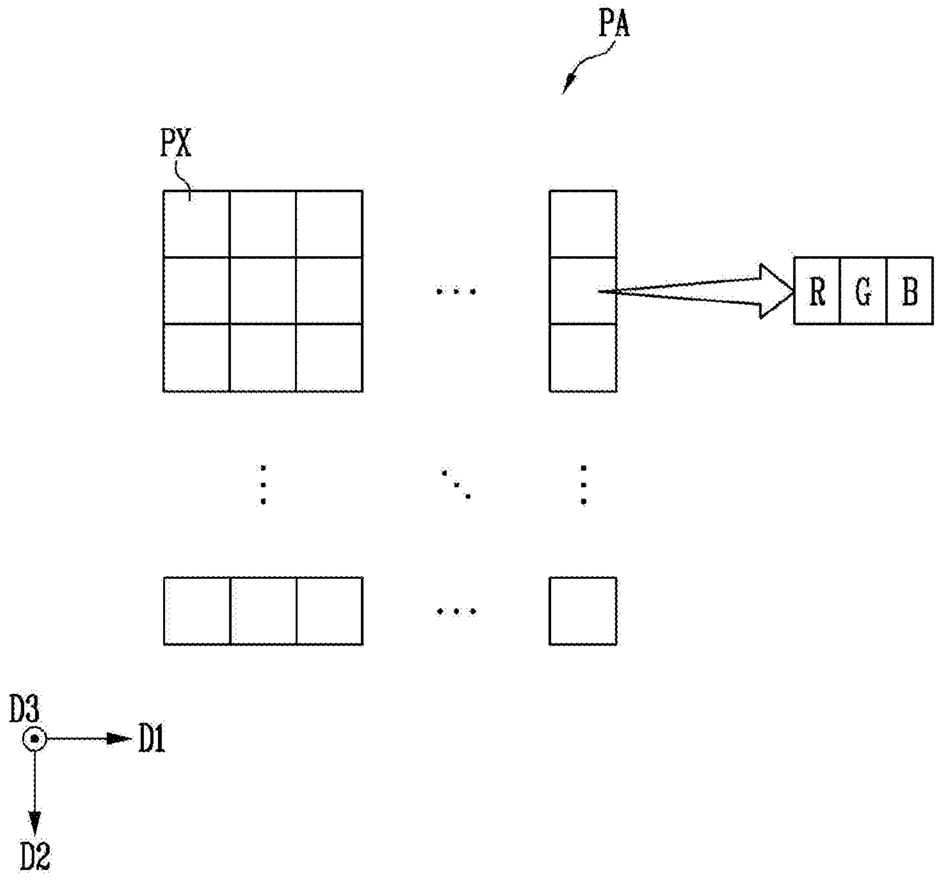
FIG. 2 is a plan view illustrating an embodiment of a pixel array included in a display unit of FIG. 1.

FIG. 1 is an exploded perspective view illustrating an embodiment of a display device according to the present invention. FIG. 2 is a plan view illustrating an embodiment of a pixel array included in a display unit of FIG. 1.

Referring to FIG. 1, a display device 100 may include a display unit 110 and a lens unit 120.

The display device 100 may operate in a two-dimensional (2D) image display mode MODE 1 or a three-dimensional (3D) image display mode MODE 2 through the display unit 110 and the lens unit 120. For example, when the lens unit 120 does not change the light path of an image output from the display unit 110, the display device 100 may display a 2D image to a viewer.

On the other hand, when the lens unit 120 changes the light path of an image output from the display unit 110, the display device 100 may provide a 3D image to a viewer. For example, the display device 100 may be a light field display system that outputs images through the lens unit 120 disposed on an upper surface of the display unit 110 so that a viewer can see different images through both eyes. The light field display system may generate a 3D image by generating a light field using the display unit 110 and the lens unit 120. Light rays generated from each pixel of the display unit 110 may form a light field directed to a specific viewing angle (or viewpoint) by lenses LS of the lens unit 120. Accordingly, the viewer may visually recognize the 3D image corresponding to the specific viewing angle.

According to an embodiment, the display device 100 may be applied to an electronic device having a display surface DS applied on at least one side, such as a smartphone, television, a tablet PC, a mobile phone, a video phone, an e-book reader, a desktop PC, a laptop PC, a netbook computer, a workstation, server, a PDA, a PMP (portable multimedia player), an MP3 player, a medical equipment, a camera, or a wearable device.

The display unit 110 may have the display surface DS extending in a first direction D1 and a second direction D2. The display surface DS may include a display area DA, which is an area where an image is output from the display unit 110, and a non-display area NDA at least partially surrounding the display area DA. For example, the non-display area NDA may delineate the boundary of the display unit 110.

In some embodiments, the display unit 110 may be a light emitting type display device. For example, the display unit 110 may include an organic light emitting display device, a quantum dot display device, a micro LED display device, or the like.

The display unit 110 may include a pixel array composed of a plurality of pixels PX each configured to emit light of one color. The pixel array may be arranged in the display area DA.

Referring to FIG. 2, a pixel array PA may include a plurality of pixels PX arranged in the first direction D1 and/or the second direction D2. Among the plurality of pixels PX, pixels PX arranged along the first direction D1 may form a pixel row, and pixels PX arranged along the second direction D2 may form a pixel column. Each of the plurality of pixels PX may include a plurality of sub-pixels. For example, each of the plurality of pixels PX may include a first pixel R configured to emit red light, a second pixel G configured to emit green light, and a third pixel B configured to emit blue light.

Each of the plurality of pixels PX may include a light emitting element and a pixel circuit configured to drive the light emitting element. In some embodiments, the pixel circuit may include thin film transistors and a capacitor. The pixels PX shown in FIGS. 1 and 2 may indicate an emission area where light is output from the light emitting element.

In some embodiments, each of the plurality of pixels PX may be connected to at least one scan line and at least one data line. When a scan signal is applied from the scan line, each of the plurality of pixels PX may receive a data voltage from the data line and may emit light by supplying a driving current to the light emitting element according to the applied data voltage.

Referring again to FIG. 1, the lens unit 120 may include a lens array LA. The lens array LA may include lenses LS arranged in the first direction D1. Each of the lenses LS may have a predetermined width to at least partially overlap a predetermined number of pixels PX. Accordingly, light rays generated from each of the pixels PX may be output at a specific viewing angle by a corresponding lens among the lenses LS. In this way, the lenses LS may refract the light transmitted from the display unit 110. In some embodiments, the lenses LS may include an optically anisotropic material or an optically isotropic material.

The lenses LS may extend in a direction slanted by a specific acute angle with respect to the second direction D2. By slanting the lenses LS with respect to the second direction D2, the visual recognition of moiré in the image output from the display device 100 may be prevented. For example, moiré that may form along the second direction D2 can be prevented.

Figure 3:
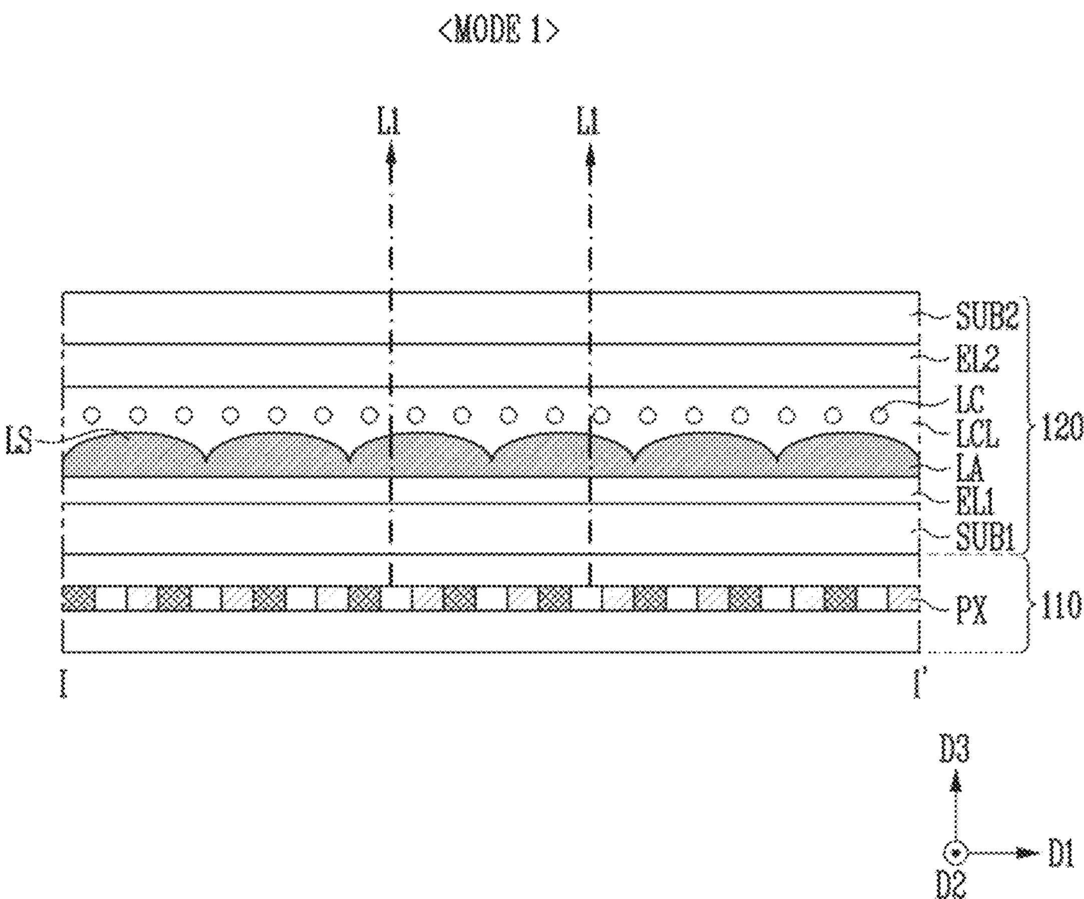
FIGS. 3 and 4 are cross-sectional views of an embodiment of the display device taken along line I-I' of FIG. 1.
Figure 4:
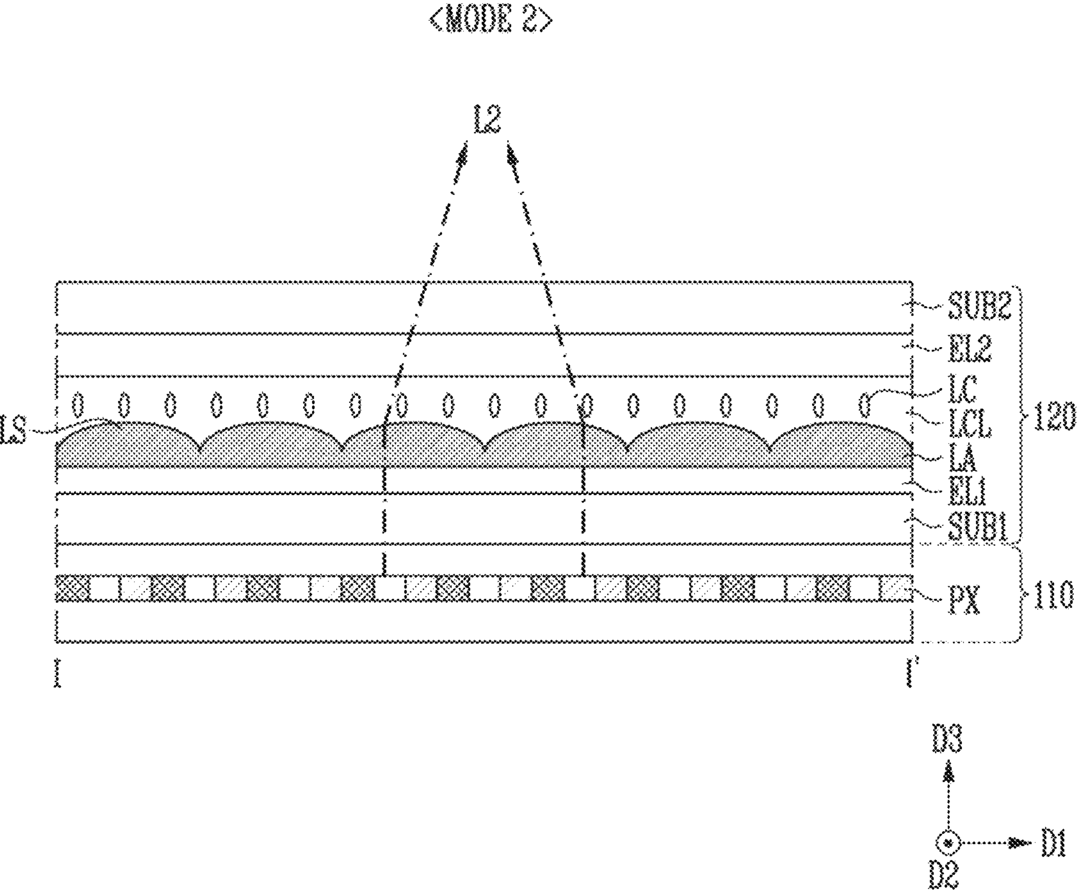

FIGS. 3 and 4 are cross-sectional views of an embodiment of the display device taken along line I-I' of FIG. 1.

In FIG. 3, liquid crystal molecules LC are shown when the display device 100 operates in a 2D image mode MODE 1 and no electric field is formed between an upper electrode and a lower electrode of the lens unit 120. In FIG. 4, liquid crystal molecules LC are shown when the display device 100 operates in a 3D image mode MODE 2 and an electric field is formed between the upper electrode and the lower electrode of the lens unit 120.

Referring to FIGS. 3 and 4, in some embodiments, the lens unit 120 may include a lower substrate SUB1, a lower electrode layer EL1, a lens array LA, a liquid crystal layer LCL, an upper electrode layer EL2, and an upper substrate SUB2.

Each of the lower substrate SUB1 and the upper substrate SUB2 may be formed of a transparent insulating material, an organic material or an inorganic material.

The lower electrode layer EL1 may be disposed on the lower substrate SUB1. For example, the lower electrode layer EL1 may at least partially overlap the lower substrate SUB1. The lower electrode layer EL1 may be conductive by including a metal material, a transparent conductive material, and/or various other conductive materials. The lower electrode layer EL1 may be formed of a single layer or multiple layers.

The lens array LA may be disposed on the lower electrode layer EL1. The lens array LA may include the lenses LS having a convex shape that extend in a second direction DR2 or a direction slanted with respect to the second direction DR2. In some embodiments, the lenses LS may include an optically anisotropic material. Each of the lenses LS may at least partially overlap a predetermined number of pixels PX and refract light L1 generated from corresponding pixels PX.

The upper electrode layer EL2 may be disposed below the upper substrate SUB2. For example, the upper electrode layer EL2 may at least partially overlap the upper substrate SUB2. The upper electrode layer EL2 may be conductive by including a metal material, a transparent conductive material, and/or various other conductive materials. The upper electrode layer EL2 may be formed of a single layer or multiple layers.

An upper lens array may be further disposed between the upper electrode layer EL2 and the liquid crystal layer LCL. For example, the upper lens array may include lenses having a concave shape that extend in the second direction DR2 or a direction slanted with respect to the second direction DR2. In some embodiments, the lenses of the upper lens array may extend in substantially the same direction as the lenses LS. In some embodiments, lenses of the upper lens array may include an optically anisotropic material.

In an embodiment, each of the lenses of the upper lens array may at least partially overlap the same number of pixels PX as each of the lenses LS, but may also overlap with two of the lenses LS. For example, each of the lenses of the upper lens array may have the same width as each of the lenses LS, but may be arranged to be shifted by a half width in the first direction DR1 compared to each of the lenses LS. Accordingly, the lenses of the upper lens array may refract light L2 generated from the pixels PX differently than the lenses LS.

The liquid crystal layer LCL may include the liquid crystal molecules LC. For example, the liquid crystal layer LCL may include the liquid crystal molecules LC oriented in one direction. According to an embodiment, the orientation of the liquid crystal molecules LC may be determined by a rubbing direction. For example, an alignment layer including a polymer layer such as polyimide may be disposed on a first lens array LA1. The liquid crystal molecules LC may be oriented by rubbing the alignment layer in a predetermined direction with a fiber such as nylon or polyester. The orientation direction of the liquid crystal molecules LC may be determined based on the rubbing direction.

The liquid crystal layer LCL may be disposed between the lower electrode layer EL1 and the upper electrode layer EL2. For example, the upper surface of the liquid crystal layer LCL may be in direct contact with the bottom surface of the upper electrode layer EL2. Accordingly, the liquid crystal layer LCL may be controlled by a power source applied to the lower electrode layer EL1 and the upper electrode layer EL2. For example, the liquid crystal molecules LC may be controlled according to an electric field formed by the power source applied to the lower electrode layer EL1 and the upper electrode layer EL2.

Referring to FIG. 3, when the display device 100 (see FIG. 1) operates in the 2D image mode MODE 1, the light L1 output from the display unit 110 might not be refracted. For example, when the power source is not applied to the lower electrode layer EL1 and the upper electrode layer EL2, the liquid crystal layer LCL might not refract the light L1 output from the display unit 110 in a third direction D3. Accordingly, the display device 100 (see FIG. 1) may display a 2D image.

Referring to FIG. 4, when the display device 100 (see FIG. 1) operates in the 3D image mode MODE 2, the light L2 output from the display unit 110 may be refracted by the lens array LA. For example, when the power source is applied to the lower electrode layer EL1 and the upper electrode layer EL2, the liquid crystal molecules LC may be tilted in the third direction D3. For example, the liquid crystal molecules LC may be in a form of an ellipse that resembles a flattened or elongated circle in the vertical direction once the power source is applied to the lower electrode layer EL1 and the upper electrode layer EL2. Accordingly, the liquid crystal layer LCL may refract the light L2, and the display device 100 (see FIG. 1) may display a 3D image.

Referring to FIG. 3, the refractive index of the liquid crystal layer LCL may be substantially the same as the refractive index of the lenses LS. For example, when the liquid crystal molecules LC of the liquid crystal layer LCL are not tilted, an absolute value of a difference between the refractive index of the liquid crystal layer LCL and the refractive index of the lenses LS may be less than 0.01. Accordingly, when light L1 output from the display unit 110 passes through the lens unit 120, unintended refraction of the light L1 can be prevented. For example, when the light L1 output from the display unit 110 passes between the lenses LS and the liquid crystal layer LCL, the light L1 may proceed in the third direction D3 without being refracted.

When the absolute value of the difference between the refractive index of the liquid crystal layer and the refractive index of the lenses LS is 0.01 or more, unintended refraction may occur when light L1 output from the display unit passes between the lenses and the liquid crystal layer. For example, when at least some of the liquid crystal molecules LC of the liquid crystal layer LCL are tilted unintentionally, light L1 output from the display unit may be refracted. Accordingly, the visibility of the image provided by the display device to the viewer may be reduced.

According to the embodiment of the present invention, when the display device 100 operates in the 2D image mode MODE 1, as the light L1 of the image displayed by the display unit 110 passes through the lens unit 120, unintended refraction might not occur. Accordingly, the display device 100 may provide the 2D image with improved visibility to the viewer.

Figure 5:
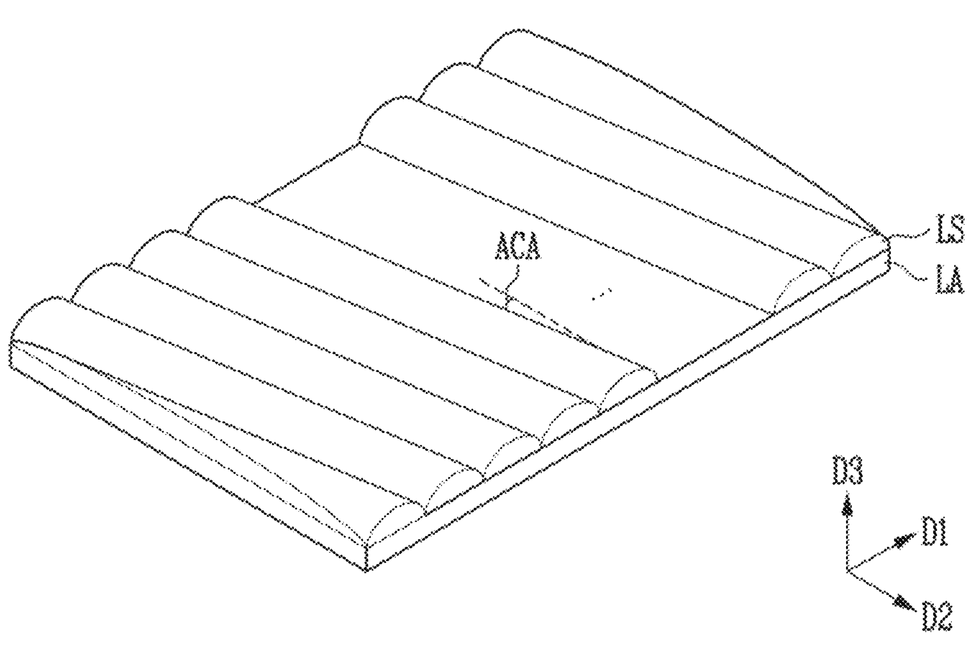
FIG. 5 is a perspective view illustrating an embodiment of a lens array of a lens unit.

FIG. 5 is a perspective view illustrating an embodiment of a lens array of a lens unit.

Referring to FIG. 5, the lens array LA may include lenses LS.

The lenses LS may be arranged in the first direction D1, and each of the lenses LS may extend in a direction slanted by a specific acute angle ACA with respect to the second direction D2. In this way, since the lenses LS are slanted with respect to the second direction D2, moiré can be prevented from being visually recognized in the image output from the display device 100 when connected to the display unit 110 of FIG. 1. For example, the lenses LS may be slanted with respect to the second direction D2 to prevent moiré that may form along the second direction D2.

According to an embodiment, the lens unit 120 further include an upper lens array between the liquid crystal layer LCL and the upper electrode layer EL2. The upper lens array may include lenses that extend in the same direction as the lenses LS. The lenses of the upper lens array have the same widths as the lenses LS but are shifted by a half width in the first direction DR1 compared to the lenses LS.

Figure 6:
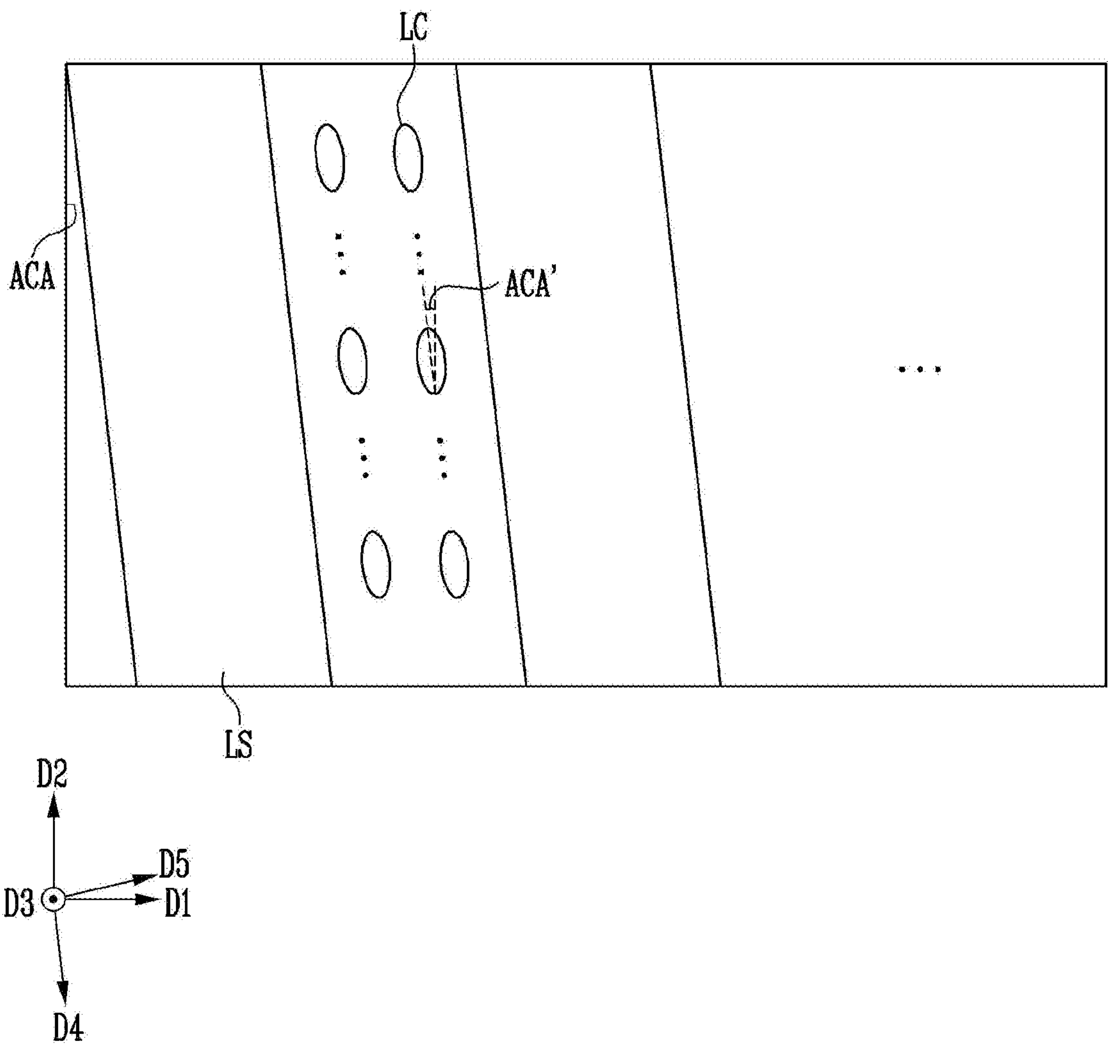
FIG. 6 is a plan view illustrating an embodiment of lenses and liquid crystal molecules when the display device operates in a two-dimensional image mode.

FIG. 6 is a plan view illustrating an embodiment of lenses and liquid crystal molecules when the display device operates in a 2D image mode.

Referring to FIG. 6, the lenses LS may be arranged in a fifth direction D5 and may extend in a fourth direction D4. The fourth direction D4 may be slanted by a first angle ACA with respect to the second direction D2 or a direction opposite to the second direction D2. The first angle ACA may be an acute angle.

The liquid crystal molecules LC may be disposed on the lenses LS. For example, the liquid crystal molecules LC may be arranged in the fourth direction D4 and/or the fifth direction D5 on the lenses LS.

When the display device 100 operates in the 2D image mode MODE 1, the liquid crystal molecules LC may be arranged parallel to a plane defined by the fourth direction D4 and the fifth direction D5. For example, the liquid crystal molecules LC may be arranged so that their long axes are parallel to the fourth direction D4.

According to an embodiment of the present invention, the liquid crystal molecules LC may be oriented in substantially the same direction as the lenses LS are slanted. For example, the liquid crystal molecules LC may be oriented in a direction slanted by a second angle ACA' with respect to the second direction D2. In some embodiments, the first angle ACA and the second angle ACA' may be substantially the same. The second angle ACA' may be an acute angle. In some embodiments, the first angle ACA and the second angle ACA' may be different. For example, a difference between the first angle ACA and the second angle ACA' may be less than an absolute value of 5 degrees.

If the direction in which the liquid crystal molecules LC are oriented does not match the direction in which the lenses LS are slanted, the visibility of the image displayed by the display device 100 may be reduced. For example, when the liquid crystal molecules LC are oriented in the fifth direction D5, liquid crystal molecules LC adjacent to the lenses LS among the liquid crystal molecules LC may be unintentionally tilted due to the slant of the surfaces of the lenses LS. For example, when the long axes of the liquid crystal molecules LC are arranged to face the fifth direction D5, even though the display device 100 of FIG. 1 operates in the 2D image mode MODE 1, the liquid crystal molecules LC may be tilted clockwise and/or counterclockwise on a plane defined by the direction D3 and the fifth direction D5 due to the convex shape of the lenses LS. In this case, the 2D image displayed on the display device 100 may be unintentionally refracted. For example, light L1 output from the display unit may be refracted while passing through tilted liquid crystal molecules LC. Accordingly, the visibility of the 2D image provided by the display device 100 may be reduced.

On the other hand, according to an embodiment of the present invention, the liquid crystal molecules LC may be oriented in substantially the same direction as the direction in which the lenses LS are slanted, so that they can be relatively less affected by the slant of the lenses LS. Accordingly, unintended tilt of the liquid crystal molecules LC can be minimized, and unintended refraction of light L1 output from the display unit 110 can be prevented. Therefore, when the display device 100 operates in the 2D image mode MODE 1, the visibility of the displayed image can be improved.

Figure 7:
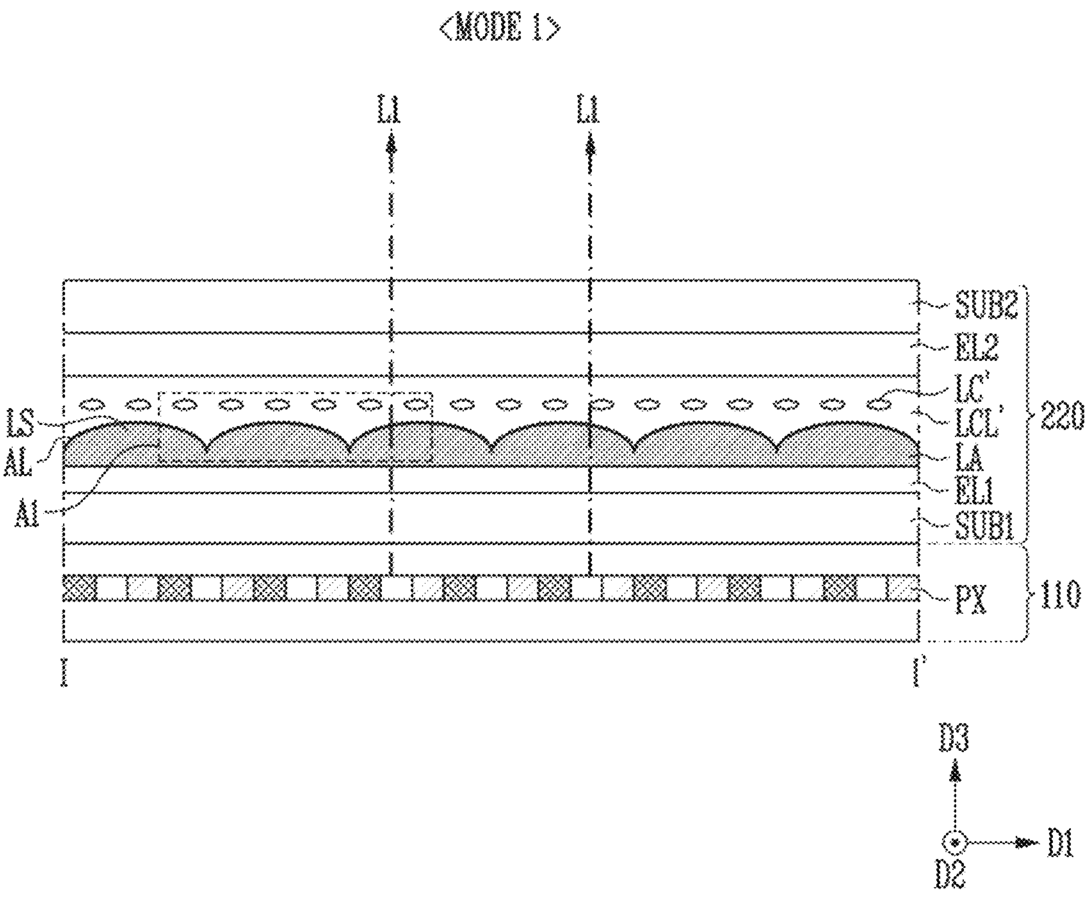
FIGS. 7 and 8 are cross-sectional views of another embodiment of the display device taken along line I-I' of FIG. 1.
Figure 8:
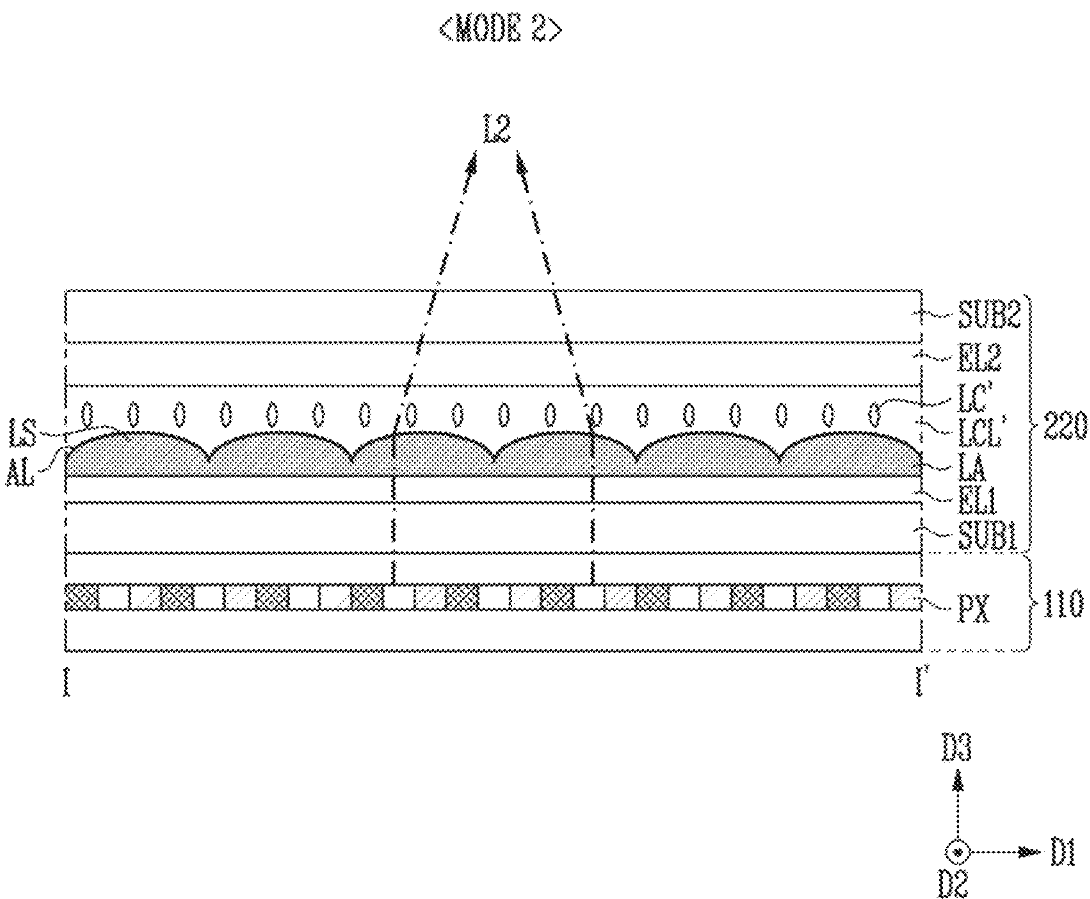

FIGS. 7 and 8 are cross-sectional views of another embodiment of the display device taken along line I-I' of FIG. 1.

In FIG. 7, liquid crystal molecules LC' are shown when the display device 100 operates in the 2D image mode MODE 1 and no electric field is formed between an upper electrode and a lower electrode of a lens unit 220. In FIG. 8, liquid crystal molecules LC' are shown when the display device 100 operates in the 3D image mode MODE 2 and an electric field is formed between the upper electrode and the lower electrode of the lens unit 220.

Referring to FIGS. 7 and 8, in some embodiments, the lens unit 220 may include a lower substrate SUB1, a lower electrode layer EL1, a lens array LA1, an alignment layer AL, a liquid crystal layer LCL', an upper electrode layer EL2, and an upper substrate SUB2.

The lower substrate SUB1, the lower electrode layer EL1, the lens array LA1, the upper electrode layer EL2, and the upper substrate SUB2 of FIGS. 7 and 8 can be described similarly to the lower substrate SUB1, the lower electrode layer EL1, the lens array LA, the upper electrode layer EL2, and the upper substrate SUB2 of FIGS. 3 and 4. Hereinafter, overlapping descriptions will be omitted.

The alignment layer AL may be disposed on the lens array LA. The alignment layer AL may entirely cover the plurality of lenses LS. For example, the alignment layer AL may have a convex shape and may be in contact with the lenses LS. Accordingly, the alignment layer AL may cover the lenses LS.

According to an embodiment, the alignment layer AL may be a photo-alignment layer. The alignment layer AL may be formed on the lens array LA using a photo-alignment agent. For example, the photo-alignment agent including polyimide may be applied on the plurality of lenses LS, and the applied photo-alignment agent may be baked. Thereafter, polarized light may be irradiated to the plurality of lenses LS to form the alignment layer AL. The irradiated light may be ultraviolet rays ranging from 240 nanometers to 380 nanometers.

The liquid crystal layer LCL' may include liquid crystal molecules LC'. For example, the liquid crystal layer LCL' may include the liquid crystal molecules LC' oriented in one direction. According to an embodiment, the liquid crystal molecules LC' may be oriented by the alignment layer AL. For example, the alignment layer AL irradiated with light may orient the liquid crystal molecules LC' in one direction.

According to an embodiment, the liquid crystal molecules LC' may be oriented in the first direction D1. For example, long axis of the liquid crystal molecules LC' may be parallel to the first direction D1 and/or a direction opposite to the first direction D1.

The liquid crystal layer LCL' may be disposed between the lower electrode layer EL1 and the upper electrode layer EL2. Accordingly, the liquid crystal layer LCL' may be controlled by the power source applied to the lower electrode layer EL1 and the upper electrode layer EL2.

Referring to FIG. 7, when the display device 100 (see FIG. 1) operates in the 2D image mode MODE 1, the light L1 output from the display unit 110 might not be refracted. For example, when the power source is not applied to the lower electrode layer EL1 and the upper electrode layer EL2, the liquid crystal layer LCL' might not refract the light L1 output from the display unit 110. Accordingly, the display device 100 (see FIG. 1) may display a 2D image.

Referring to FIG. 8, when the display device 100 (see FIG. 1) operates in the 3D image mode MODE 2, the light L2 output from the display unit 110 may be refracted by the lens array LA1. For example, when the power source is applied to the lower electrode layer EL1 and the upper electrode layer EL2, the liquid crystal molecules LC' may be tilted in the third direction D3. For example, the liquid crystal molecules LC' may be in a form of an ellipse that resembles a flattened or elongated circle in vertical direction once the power source is applied to the lower electrode layer EL1 and the upper electrode layer EL2. Accordingly, the liquid crystal layer LCL' may refract the light L2, and the display device 100 (see FIG. 1) may display a 3D image.

Referring to FIG. 7, the refractive index of the liquid crystal layer LCL' may be substantially the same as the refractive index of the lenses LS. For example, when the liquid crystal molecules LC' of the liquid crystal layer LCL' are not tilted, an absolute value of a difference between the refractive index of the liquid crystal layer LCL' and the refractive index of the lenses LS' may be less than 0.01. Accordingly, when light L1 output from the display unit 110 passes through the lens unit 120, unintended refraction of light can be prevented. For example, when the light L1 output from the display unit 110 passes between the lenses LS' and the liquid crystal layer LCL', the light L1 may proceed in the third direction D3 without being refracted.

According to the embodiment of the present invention, when the display device 100 operates in the 2D image mode MODE 1, as the light L1 of the image displayed by the display unit 110 passes through the lens unit 220, unintended refraction might not occur. Accordingly, the display device 100 may provide a 2D image with improved visibility to the viewer.

Figure 9:
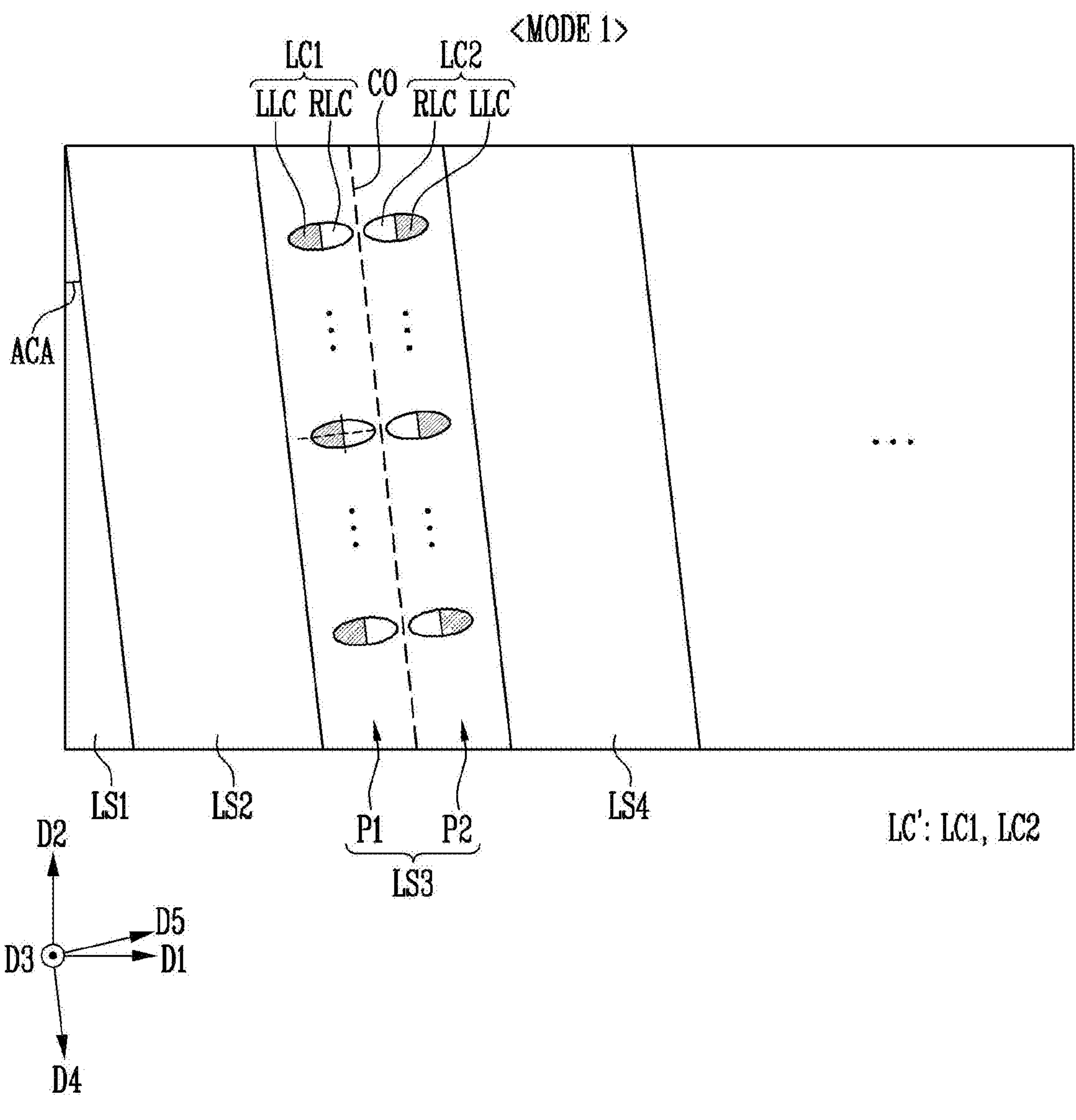
FIG. 9 is a plan view illustrating another embodiment of lenses and liquid crystal molecules when the display device operates in a two-dimensional image mode.

FIG. 9 is a plan view illustrating another embodiment of lenses and liquid crystal molecules when the display device operates in a 2D image mode.

Referring to FIG. 9, the lenses LS may be arranged in the fifth direction D5 and may extend in the fourth direction D4. The fourth direction D4 may be slanted by the first angle ACA with respect to the second direction D2 or a direction opposite to the second direction D2. The first angle ACA may be an acute angle.

The lenses LS may include first to n-th lenses LS1 to LSn arranged in the fifth direction D5. Hereinafter, for convenience of description, the third lens LS3 is mainly described, but all of the first to n-th lenses LS1 to LSn may be described in the same way.

The third lens LS3 may have a central optical axis CO. The central optical axis CO may extend in substantially the same direction as the direction in which the lenses LS are slanted.

The third lens LS3 may include a first portion P1 and a second portion P2 that are symmetrical to each other about the central optical axis CO. For example, the first portion P1 and the second portion P2 may be symmetrical to each other in the fifth direction D5 or a direction opposite to the fourth direction D5 based on a virtual plane defined by the third direction D3 and the fourth direction D4.

The liquid crystal molecules LC' may be disposed on the third lens LS3. For example, when the display device 100 operates in the 2D image mode MODE 1, each of the liquid crystal molecules LC' may be aligned so that its long axis faces the fifth direction D5 or a direction opposite to the fifth direction D5.

The liquid crystal molecules LC' may include first liquid crystal molecules LC1 and second liquid crystal molecules LC2. The first liquid crystal molecules LC1 may be arranged to at least partially overlap on the first portion P1, and the second liquid crystal molecules LC2 may be arranged to at least partially overlap on the second portion P2.

Each of the liquid crystal molecules LC' may include a first liquid crystal portion LLC and a second liquid crystal portion RLC. For example, each of the liquid crystal molecules LC' may include the first liquid crystal portion LLC and the second liquid crystal portion RLC that are symmetrical based on a corresponding minor axis. For example, elliptical shape liquid crystal molecules LC' may be bisected along the short axis, forming the minor axis.

The liquid crystal molecules LC' may be oriented in a direction that intersects the direction in which the third lens LS3 is slanted. For example, the liquid crystal molecules LC' may be oriented in the fifth direction D5 or in a direction opposite to the fifth direction D5. The minor axis of the liquid crystal molecules LC' may be oriented substantially the same direction as the direction in which the central optical axis CO is slanted.

The liquid crystal molecules LC' may be oriented to be symmetrical to each other based on the direction in which the third lens LS3 is slanted. For example, the first liquid crystal molecules LC1 and the second liquid crystal molecules LC2 may be oriented to be symmetrical to each other based on the fourth direction D4.

Figure 10:
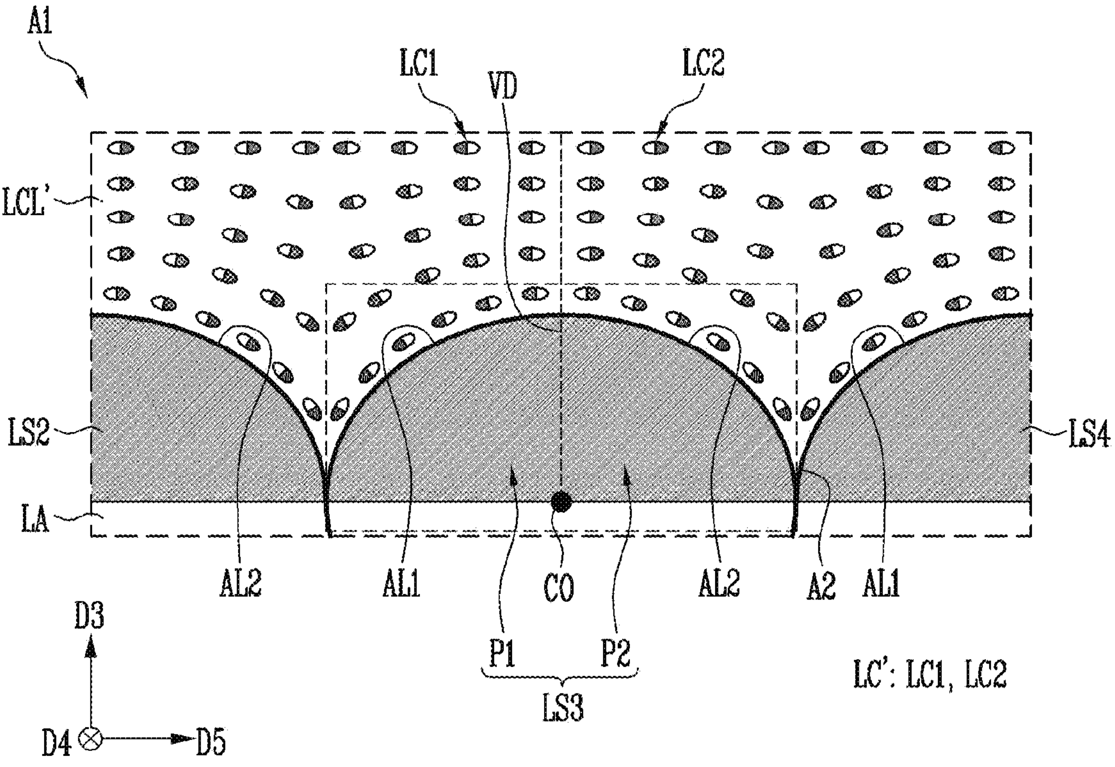
FIG. 10 is a cross-sectional view illustrating a first area of FIG. 7.

FIG. 10 is a cross-sectional view illustrating a first area of FIG. 7.

Referring to FIG. 10, the alignment layer AL may include a first alignment layer AL1 and a second alignment layer AL2 disposed on the third lens LS3. For example, the alignment layer AL may include the first alignment layer AL1 and the second alignment layer AL2 arranged to cover the top surfaces of first portion P1 and the second portion P2, respectively.

The liquid crystal molecules LC' may be oriented to be symmetrical to each other based on a virtual plane VD. For example, the first liquid crystal molecules LC1 and the second liquid crystal molecules LC2 may be oriented to be symmetrical to each other based on the virtual plane VD defined by the third direction D3 and the fourth direction D4.

According to an embodiment of the present invention, the first liquid crystal molecules LC1 and the second liquid crystal molecules LC2 may be oriented by the first alignment layer AL1 and the second alignment layer AL2, respectively. For example, when the liquid crystal molecules LC' are oriented, a black matrix may be disposed on the first alignment layer AL1. In this case, light may be irradiated only to the second alignment layer AL2. For example, ultraviolet rays may be irradiated to the second alignment layer AL2. The second liquid crystal molecules LC2 may be oriented in one direction by the second alignment layer AL2 oriented by the ultraviolet rays. For example, each of the second liquid crystal molecules LC2 may be oriented so that the first liquid crystal portion LLC (see FIG. 9) faces the fifth direction D5. Thereafter, the black matrix may be removed from the first alignment layer AL1, and a black matrix may be disposed on the second alignment layer AL2. Then, light may be irradiated to the first alignment layer AL1, and the first liquid crystal molecules LC1 may be oriented in a direction opposite to the direction in which the second liquid crystal molecules LC2 are oriented, by the first alignment layer AL1 oriented by the ultraviolet rays. For example, each of the first liquid crystal molecules LC1 may be oriented so that the first liquid crystal portion LLC faces a direction opposite to the fifth direction D5. The black matrix may be removed from the alignment layer AL after all liquid crystal molecules LC' are oriented.

Figure 11:
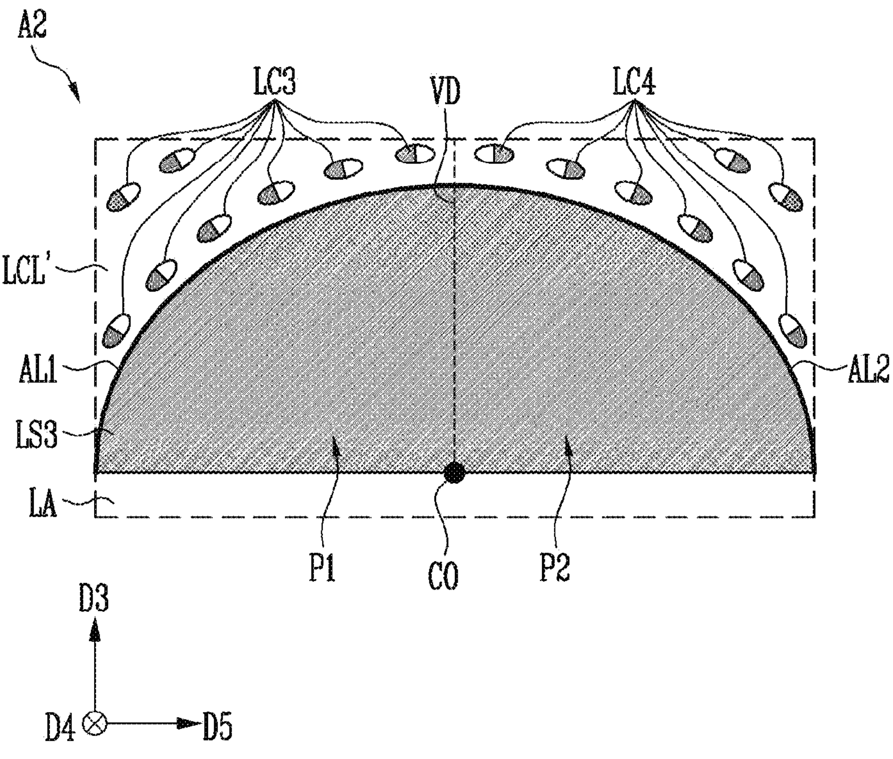
FIG. 11 is a cross-sectional view illustrating a second area of FIG. 10.

FIG. 11 is a cross-sectional view illustrating a second area of FIG. 10.

Referring to FIG. 11, the first liquid crystal molecules LC1 and the second liquid crystal molecules LC2 may include third liquid crystal molecules LC3 and fourth liquid crystal molecules LC4, respectively. The first liquid crystal molecules LC1 may include the third liquid crystal molecules LC3 disposed adjacent to the first alignment layer AL1, and the second liquid crystal molecules LC2 may include the fourth liquid crystal molecules LC4 disposed adjacent to the second alignment layer AL2. The third liquid crystal molecules LC3 and the fourth liquid crystal molecules may be symmetrical to each other about the central optical axis CO.

The third liquid crystal molecules LC3 and the fourth liquid crystal molecules LC4 may be tilted by a convex shape of the third lens LS3. For example, the third liquid crystal molecules LC3 may be tilted counterclockwise by the slant formed by the first portion P1. Also, the fourth liquid crystal molecules LC4 may be tilted clockwise by the slant formed by the second portion P2.

In this case, the third liquid crystal molecules LC3 and the fourth liquid crystal molecules LC4 may be oriented in opposite directions by the first alignment layer AL1 and the second alignment layer AL2, respectively. For example, the third liquid crystal molecules LC3 may be oriented in the fifth direction D5, and the fourth liquid crystal molecules LC4 may be oriented in a direction opposite to the fifth direction D5. Accordingly, the tilts of the third liquid crystal molecules LC3 and the fourth liquid crystal molecules LC4 caused by the convex shape of the third lens LS3 may decrease along the orientation direction. For example, the tilts of the third liquid crystal molecules LC3 and the fourth liquid crystal molecules LC4 with respect to a plane defined by the fourth direction D4 and the fifth direction D5 may decrease. According to an embodiment, tilted angles of the third liquid crystal molecules LC3 and the fourth liquid crystal molecules LC4 with respect to the plane defined by the fourth direction D4 and the fifth direction D5 may be 5 degrees or less.

If the liquid crystal molecules LC' are uniformly oriented in one direction, the tilts of either the third liquid crystal molecules LC3 or the fourth liquid crystal molecules LC4 may increase. For example, if the liquid crystal molecules LC' are oriented in the fifth direction D5, the tilts of the third liquid crystal molecules LC3 may decrease, but the tilts of the fourth liquid crystal molecules LC4 may increase. In this case, when light L1 output from the display unit passes through the fourth liquid crystal molecules LC', unintended refraction of light may occur. Accordingly, the visibility of the image displayed from the display device 100 may be reduced.

On the other hand, according to the embodiment of the present invention, the tilts of the third liquid crystal molecules LC3 and the fourth liquid crystal molecules LC4 may decrease uniformly (or overall). For example, the tilts of the third liquid crystal molecules LC3 in the third direction D3 may be reduced by the orientation in the fifth direction D5, and the tilts of the fourth liquid crystal molecules LC4 in the third direction D3 may be reduced by the orientation in a direction opposite to the fifth direction D5. Accordingly, unintended refraction of light L1 output from the display unit 110 might not occur or at least be reduced, and the visibility of the image displayed by the display device 100 can be improved.

According to the embodiments of the present invention, a lens unit capable of outputting an image with improved visibility and a display device including the same may be provided.

Effects according to the embodiments are not necessarily limited by the above-described contents, and more various other effects are included in the present specification.

Although specific embodiments and implementations have been described herein, other embodiments and modifications may be derived from the foregoing descriptions. Accordingly, the spirit of the present disclosure is not limited to the foregoing embodiments but may also be applied to the claims set forth below, various obvious modifications, and equivalents.

What is claimed is:

1. A display device comprising:

a display unit including a plurality of pixels arranged in a first direction and a second direction perpendicular to the first direction; and a lens unit disposed on the display unit and configured to refract an image output from the display unit, wherein the lens unit includes:

a lens array including a plurality of lenses each extending at an acute angle with respect to the second direction; and a liquid crystal layer disposed on the lens array, wherein the display device is configured to operate in a two dimensional (2D) mode and a three dimensional (3D) mode, wherein the liquid crystal layer includes liquid crystal molecules oriented such that a long axis of the liquid crystal molecules is slanted substantially at the acute angle with respect to the second direction, when the display device is operated in the 2D mode, wherein an absolute value of a difference between a refractive index of the liquid crystal layer and a refractive index of the lenses is less than 0.01 when the display device is operated in the 2D mode, wherein light of the image output is incident on the liquid crystal layer after passing through the plurality of lenses.

2. The display device of claim 1, wherein the plurality of lenses are rubbed in substantially the same direction as an extension direction of the lenses.

3. The display device of claim 1, wherein the lens unit further includes:

a lower substrate;

a lower electrode layer disposed on the lower substrate; and an upper electrode layer disposed on the lower electrode layer, wherein the liquid crystal layer is disposed between the lower electrode layer and the upper electrode layer.

4. The display device of claim 3, wherein the liquid crystal molecules are tilted according to a voltage applied to the lower electrode layer and the upper electrode layer.

5. The display device of claim 1, wherein the plurality of lenses include an optically anisotropic material.

6. The display device of claim 1, wherein the liquid crystal layer has substantially the same refractive index as the lens array.

7. A display device comprising:

a display unit including a plurality of pixels arranged in a first direction and a second direction perpendicular to the first direction; and a lens unit disposed on the display unit and configured to refract an image output from the display unit, wherein the lens unit includes:

a lens array including a plurality of lenses, wherein the plurality of lenses extend and are slanted at an acute angle with respect to the second direction; and a liquid crystal layer disposed on the lens array, wherein the liquid crystal layer includes liquid crystal molecules, wherein an absolute value of a difference between a refractive index of the liquid crystal layer and a refractive index of the lenses is less than 0.01 when the liquid crystal molecules are not tilted, wherein light of the image output is incident on the liquid crystal layer after passing through the plurality of lenses, wherein the display device is configured to operate in a two dimensional (2D) mode and a three dimensional (3D) mode, and when the display device operates in the 2D mode, a long axis of the liquid crystal molecules is slanted substantially at the acute angle with respect to the second direction.

8. The display device of claim 7, wherein the plurality of lenses are rubbed in substantially the same direction as the slant of the lenses.

9. The display device of claim 7, wherein the lens unit further includes:

a lower substrate;

a lower electrode layer disposed on the lower substrate; and an upper electrode layer disposed on the lower electrode layer, wherein the liquid crystal layer is disposed between the lower electrode layer and the upper electrode layer.

10. The display device of claim 9, wherein the liquid crystal molecules tilt in response to a voltage applied to the lower electrode layer and the upper electrode layer.

11. The display device of claim 7, wherein the plurality of lenses include an optically anisotropic material.

12. An electronic device comprising:

a display device comprising:

a display unit including a plurality of pixels arranged in a first direction and a second direction perpendicular to the first direction; and a lens unit disposed on the display unit and configured to refract an image output from the display unit, wherein the lens unit includes:

a lens array including a plurality of lenses each extending at an acute angle with respect to the second direction; and a liquid crystal layer disposed on the lens array, wherein the display device is configured to operate in a two dimensional (2D) mode and a three dimensional (3D) mode, wherein the liquid crystal layer includes liquid crystal molecules oriented such that a long axis of the liquid crystal molecules is slanted substantially at the acute angle with respect to the second direction, when the display device is operated in the 2D mode, wherein an absolute value of a difference between a refractive index of the liquid crystal layer and a refractive index of the lenses is less than 0.01 when the display device is operated in the 2D mode, wherein light of the image output is incident on the liquid crystal layer after passing through the plurality of lenses.

* * * * *